May 12, 1936.  W. DUDLEY  2,040,767
METHOD AND APPARATUS FOR COATING PIPES AND TUBES
Filed May 24, 1933
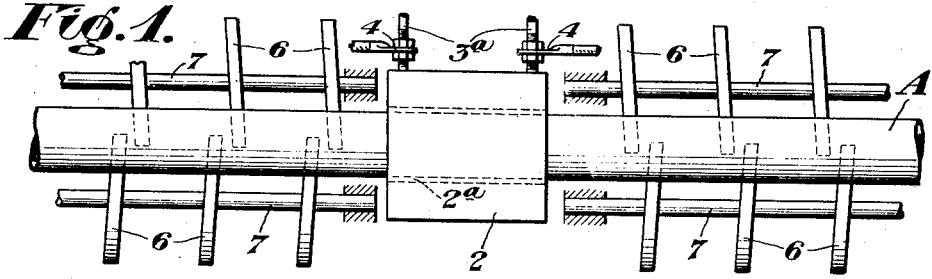
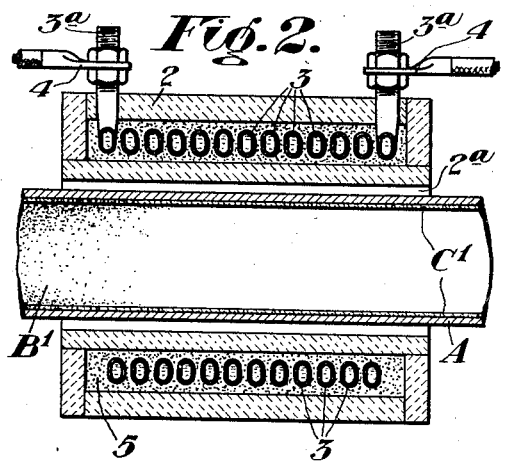
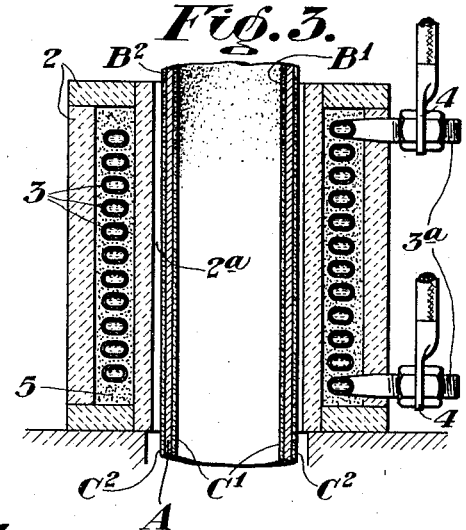
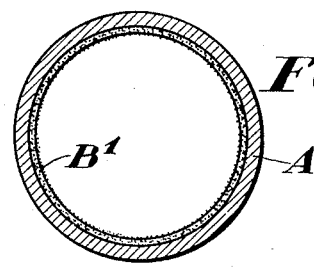
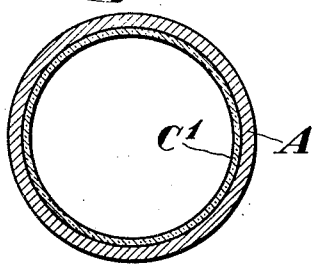
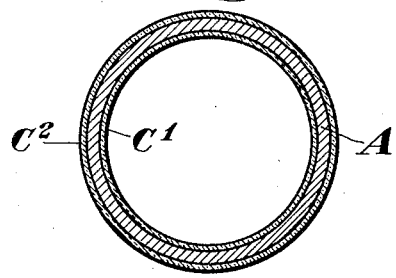
Inventor:
WRAY DUDLEY,
by Usina & Rauber
his Attorneys.

Patented May 12, 1936

2,040,767

UNITED STATES PATENT OFFICE 2,040,767

METHOD AND APPARATUS FOR COATING PIPES AND TUBES

Wray Dudley, Mount Lebanon, Pa., assignor to National Tube Company, a corporation of New Jersey Application May 24, 1933, Serial No. 672,718

1 Claim. (Cl. 91—73)

This invention relates to a method and apparatus for coating iron or steel pipes and tubes with a rust or corrosition resistant material, and also contemplates the coating of pipe fittings, couplings, and other tubular articles.

Numerous attempts have been made in the past to interiorly and/or exteriorly coat pipes and tubes with rust-resistant compositions, but without material success. Among the numerous difficulties encountered in satisfactorily coating pipes and tubes is that it is extremely difficult to make the coating adhere to the pipe. In the past, when attempting to secure what might be called an "atomic bond" between the coating and the tube, the extremely high heat necessary to form the union of the two materials would crack the surface of the coating.

In accordance with the practice of the present invention, a pipe or tube is coated in such manner as to provide an atomic bond without in any way injuring the surface of the coating.

One object of the present invention is to provide a novel method and apparatus for obtaining a vitreous or other enamel exterior and/or interior coating for pipes and tubes which will permit a finally finished and atomically bonded coating on the tube.

Another object of the invention is to provide an entirely satisfactory coating which may be extremely economical to obtain by the provision of high frequency electric currents applied to the body of the metal to be coated in such manner as to induce electric currents therein whereby the temperature of the metal is raised to the fusion point of the coating and the heat thus generated within the metal is conducted outwardly therefrom to and through the coating, thus driving all volatile substances within the coating to the exterior before hardening of its outer surface occurs, thereby preventing the entrapping of volatile substances within the body of the coating and insuring an intimate fusion between the surfaces of the metal and the coating without heating the entire volume of the tube to a deleterious temperature, whereby the temper or other characteristics of the base metal is not detrimentally affected.

The foregoing and further objects will appear after referring to the drawing, in which:

Figure 1 is a plan of the apparatus of the invention.

Figure 2 is a sectional elevation of the high frequency indication heater of the invention.

Figure 3 is a view similar to Figure 2 but providing a novel disposition for practicing a modified form of the invention.

Figures 4, 5, and 6 are sectional end elevations of the improved article of the invention.

Referring more particularly to the drawing, the numeral 2 designates a casing in which there is disposed an electrical high frequency induction heater coil 3. The high frequency induction heater coil is composed of a plurality of tubular oval-shaped convolutions, the ends of the coil being extended through the housing 2 and threaded as at $3^a$ to provide for suitable electrical connections, generally indicated at 4. The threaded ends $3^a$ of the coil likewise provide access for suitable connections (not shown) associated with a cooling medium, such as water. Mica, or other suitable insulation, is disposed between the various convolutions of the coil 3 and the housing 2.

Referring to Figure 1, the housing 2, which is provided with a continuous and centrally disposed opening $2^a$, is shown as associated with a "disk" type conveyer. This conveyer is composed of a plurality of disks 7 mounted on a rotating shaft $7^a$, and are shown in the drawing as being canted and overlapped in staggered relationship.

In accordance with the method of the invention, a pipe or tube A which has been previously coated internally with moistened "frit" or other suitable noncorroding medium, as at B' (Figure 4), is conveyed by the disks 7 of the conveyor slowly through the central opening $2^a$ in the induction heater. As the tube is slowly conveyed through the opening $2^a$, the induction coil 3 will establish an extremely high heat area on and adjacent the inner surface of the tube, and cause fusion of the "frit", providing an extremely smooth and even noncorrosive coating, as shown at C' (Figure 5).

Referring to Figure 3 of the drawing, I have disclosed a modification of the invention in which a tube may be coated internally and, if desired, also externally. In practicing this form of the invention, the housing 2 of the induction heater is disposed with its opening $2^a$ in a vertical plane. A suitable elevating platform (not shown) is provided for slowly lowering the tube A through the opening $2^a$ of the heater, it being readily understood that considerable difficulty would be had in conveying the tube horizontally with the moistened "frit" on its outer surface. As the tube is slowly lowered through the opening $2^a$, the "frit" on the outer and inner surfaces of the tube as shown at B' and $B^2$, respectively, will become fused to the surfaces of the tube and emerge at the bottom of the induction heater in the smooth and even noncorrosive inner and outer coating indicated at C' and C².

While I have shown and described several specific embodiments of my invention, it will be understood that I do not wish to be limited exactly thereto, since various modifications may be made without departing from the scope of my invention, as defined in the following claim.

I claim:

The method of coating the surfaces of a long metallic tube with a vitreous enamel coating which consists in applying the coating to the surfaces of the tube in the form of moistened frit, moving the tube through an electric induction heating furnace having a length equal to only a fraction of the length of the tube to be coated, and inducing electric heating currents in said tube progressively from end to end as it moves through the furnace whereby heat of sufficient magnitude is generated in the metal of the tube to fuse the frit on its surfaces to form the vitreous enamel coating.

WRAY DUDLEY.